US009175717B2

(12) United States Patent
Tardif

(10) Patent No.: US 9,175,717 B2
(45) Date of Patent: Nov. 3, 2015

(54) SAFETY CARABINER

(75) Inventor: Sebastien Tardif, Saint Nazaire (FR)

(73) Assignee: WICHARD (FR)

( * ) Notice: Subject to any disclaimer, the term of this patent is extended or adjusted under 35 U.S.C. 154(b) by 248 days.

(21) Appl. No.: 13/523,131

(22) Filed: Jun. 14, 2012

(65) Prior Publication Data

US 2012/0317762 A1 Dec. 20, 2012

(30) Foreign Application Priority Data

Jun. 16, 2011 (FR) ...................................... 11 55268

(51) Int. Cl.
*F16B 45/02* (2006.01)

(52) U.S. Cl.
CPC ............ *F16B 45/02* (2013.01); *Y10T 24/45435* (2015.01)

(58) Field of Classification Search
CPC .............................. F16B 45/02; A44C 5/2033
USPC ............ 24/601.5, 599.4, 599.5, 599.9, 598.4, 24/599.1, 599.6, 599.7, 599.8, 600.1, 24/600.2
See application file for complete search history.

(56) References Cited

U.S. PATENT DOCUMENTS

| 8,156,617 B2* | 4/2012 | Schwappach et al. ....... 24/599.9 |
| 8,555,470 B2* | 10/2013 | Spataro et al. ............... 24/599.9 |
| 2010/0325848 A1 | 12/2010 | Liang |
| 2012/0317761 A1* | 12/2012 | Tardif .......................... 24/599.5 |

FOREIGN PATENT DOCUMENTS

| GB | 2441142 A | 2/2008 |
| WO | 97/11281 A1 | 3/1997 |

* cited by examiner

*Primary Examiner* — Robert J Sandy
*Assistant Examiner* — Michael Lee
(74) *Attorney, Agent, or Firm* — Cantor Colburn LLP

(57) ABSTRACT

The safety carabiner includes a body including a central portion extended at the ends thereof by a first hook-shaped branch provided with a retaining portion and a second branch, respectively, the first branch having a retaining portion, and a closing finger pivotably mounted on the second branch of the body around a pivot axis, between closed and open positions of the carabiner; where retaining portion includes a slender end portion that is generally tapered seen from the side and the retaining portion is configured so that, when the carabiner extends substantially perpendicular to said flat support, and the first and second branches of the carabiner are bearing on said flat support, the free end of the end portion forms the bearing zone of the first branch on said flat support.

10 Claims, 7 Drawing Sheets

SAFETY CARABINER

TECHNICAL FIELD

The present invention relates to a safety carabiner used, inter alia, for climbing, speleology, and water sports, such as sailing, or as a safety measure protecting people working at heights from falling.

BRIEF DISCUSSION OF RELATED ART

Document WO 97/11281 describes a safety carabiner including:
- a body comprising a central portion extended at the ends thereof by a first hook-shaped branch provided with a retaining portion and a second branch, respectively, and
- a closing finger pivotably mounted on the second branch of the body around a hinge pin, between a closed position in which the closing finger cooperates with the retaining portion and an open position in which the closing finger is tilted toward the inside of the carabiner so as to allow the carabiner to be attached on a safety line, which may for example consist of a strap or rope, or any other anchor point.

The safety carabiner described in document WO 97/11281 does not, due to the shape of the retaining portion, allow easy attachment of a small safety line, such as a strap approximately 3 mm thick or a cable or rope with a 6 mm diameter, stretched on or along a flat surface, which may be detrimental, in particular in water sports.

In fact, such a safety carabiner requires the use of one hand to grip the safety line and move it away from the flat surface, and the other hand to actuate the closing finger of the carabiner and attach the safety line.

BRIEF SUMMARY

The present invention aims to resolve these drawbacks.

The technical problem at the base of the invention therefore concerns providing a safety carabiner that has a simple and cost-effective structure, and that allows easy and quick attachment of a small strap, rope or cable, or similar device, stretched along a flat surface.

To that end, the present invention relates to a safety carabiner including:
- a body comprising a central portion extended at the ends thereof by a first hook-shaped branch and a second branch, respectively, the first branch including a retaining portion comprising a slender end portion, the slender end portion being generally tapered seen from the side,
- a closing finger pivotably mounted on the second branch of the body around a hinge pin, between a closed position in which the closing finger cooperates with the retaining portion and an open position in which the closing finger is tilted toward the inside of the carabiner, characterized in that the retaining portion is configured so that, when the carabiner extends transverse to a flat support, and preferably substantially perpendicular to said flat support, and the first and second branches of the body are in position bearing on said flat support, the free end of the end portion forms the bearing zone of the first branch on said flat support, and in that the end portion of the retaining portion is laterally delimited by at least two substantially flat side surfaces converging toward the free end of the end portion.

Such a shape of the retaining portion, and more particularly of the end portion thereof, makes it possible to attach a small safety line stretched over or along a flat surface, without requiring that the safety line be held by hand to move it away from the flat surface. In particular, the lateral shape of the end portion makes it possible to facilitate the attachment of a safety line stretched along a flat surface by laterally tilting the body of the carabiner relative to the flat surface.

In this way, the safety carabiner according to the invention ensures easy and quick attachment of the safety line using only one hand.

It should be noted that the second branch could be in direct or indirect contact with the flat support by means of the portion of the closing finger mounted thereon.

According to one embodiment of the invention, the retaining portion is configured such that the free end of the end portion is situated at a first distance d1 from said flat support smaller than or equal to 3 mm, when the carabiner extends transverse to a flat support, and preferably substantially perpendicular to said flat support, the first branch of the carabiner is bearing on said flat support and the second branch is situated at a second distance d2 from said flat support, for at least a value of the second distance greater than 10 mm, preferably greater than 20 mm, and advantageously greater than 30 mm.

Advantageously, the free end of the end portion is oriented toward the outside of the carabiner.

According to one embodiment, the end portion of the retaining portion is at least partially inwardly and outwardly delimited by a substantially flat inner surface and a substantially flat outer surface, respectively, converging toward one another.

Advantageously, the substantially flat inner and outer surfaces extend substantially parallel to the hinge pin.

Advantageously, the substantially inner and outer flat surfaces form an angle smaller than or equal to 90°, preferably between 10 and 80°, preferably between 20 and 70°, and advantageously between 30 and 60°.

According to one embodiment of the invention, when the carabiner extends substantially perpendicular to a flat support and the first and second branches of the body are in position bearing on the flat support, the substantially flat outer surface and the flat support form an angle smaller than or equal to 90°, preferably between 10 and 80°, preferably between 20 and 70°, and advantageously between 30 and 60°.

Advantageously, the substantially flat inner and outer surfaces are connected to one another by a rounded intermediate portion.

Preferably, the rounded intermediate portion is outwardly delimited by a substantially cylindrical surface portion extending substantially parallel to the hinge pin. The substantially cylindrical surface portion preferably has a curve radius smaller than or equal to 3 mm, and for example smaller than or equal to 2 mm.

According to one embodiment, the two substantially flat side surfaces form an angle smaller than or equal to 120°, preferably between 30 and 90°, and for example approximately 60°.

According to one embodiment of the invention, the retaining portion is substantially in the shape of a T when seen from the front, and the free end of the pivot finger has a housing with a shape substantially complementary to that of the retaining portion and intended to receive said portion.

Advantageously, the closing finger comprises at least one portion protruding in the housing intended to receive the retaining portion and intended to cooperate with a retaining surface formed on the retaining portion, said at least one portion being arranged to flatten the retaining surface when the load exerted on the carabiner exceeds a predetermined value.

According to one alternative embodiment of the invention, one of the walls delimiting the housing intended to receive the retaining portion is arranged to cooperate with a retaining surface formed on the retaining portion so as to flatten the retaining surface when the load exerted on the carabiner exceeds a predetermined value.

BRIEF DESCRIPTION OF THE DRAWINGS

In any case, the invention will be well understood using the following description, in reference to the appended diagrammatic drawing showing, as non-limiting examples, several embodiments of this safety carabiner.

DETAILED DESCRIPTION

Figure 1:
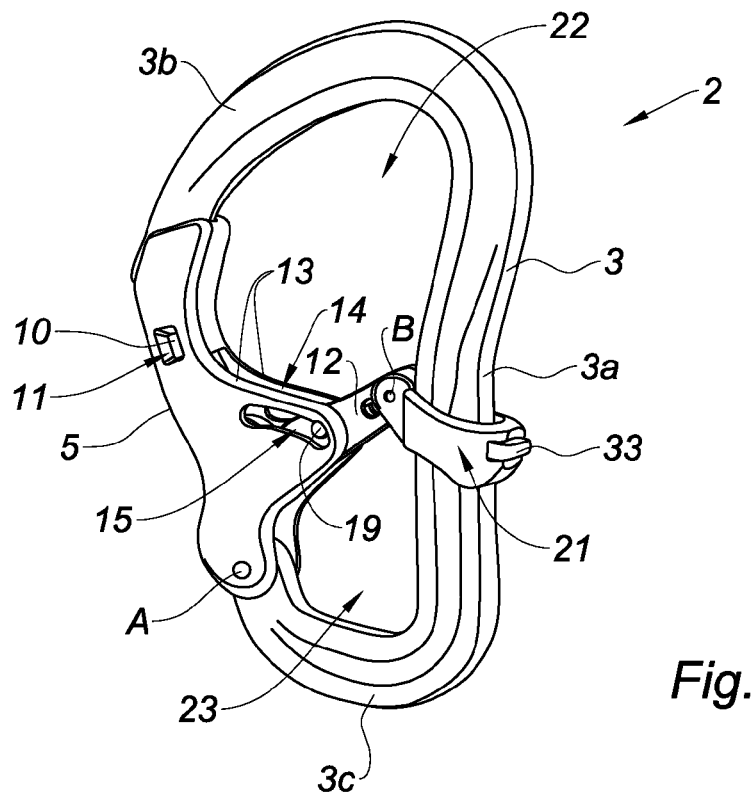
FIG. 1 is a perspective view of the safety carabiner according to a first embodiment of the invention showing the closing finger in the closed position.
Figure 2:
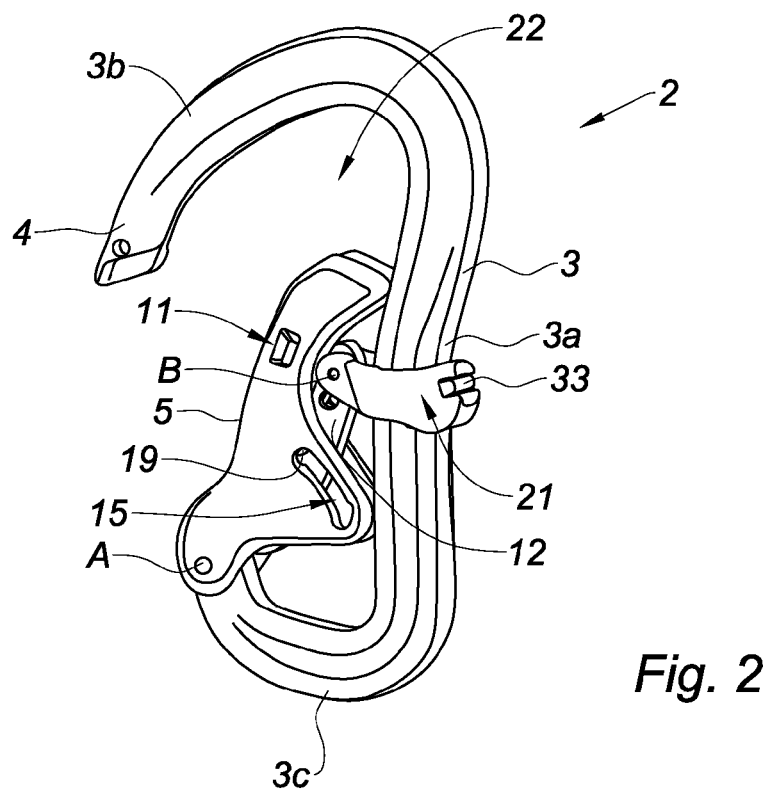
FIG. 2 is a perspective view of the safety carabiner of FIG. 1 showing the closing finger in the open position.

FIGS. 1 to 14 show a safety carabiner 2 that can be used, inter alia, for climbing, speleology, and water sports, such as sailing, or as a safety measure protecting people working at heights from falling.

The safety carabiner 2 comprises a generally C-shaped body 3. The body 3 comprises a substantially rectilinear central portion 3a extended at its ends by a first hook-shaped branch 3b and a second curved branch 3c. The first hook-shaped branch 3b comprises a retaining portion 4 at its free end.

The safety carabiner 2 also comprises a closing finger 5 pivotably mounted around a hinge pin A situated at the free end of the second curved branch 3c, between a closed position in which the closing finger 5 cooperates with the retaining portion 4 of the first hook-shaped branch 3b and an open position in which the closing finger 5 is tilted toward the inside of the carabiner.

The safety carabiner 2 also comprises locking means movably mounted on the closing finger 5 between a locked position in which the locking means cooperate with the first hook-shaped branch 3b, and more particularly with the retaining portion 4, so as to lock the closing finger 5 in the closed position thereof, and an unlocked position in which the closing finger 5 can be moved toward its open position.

Figure 3:
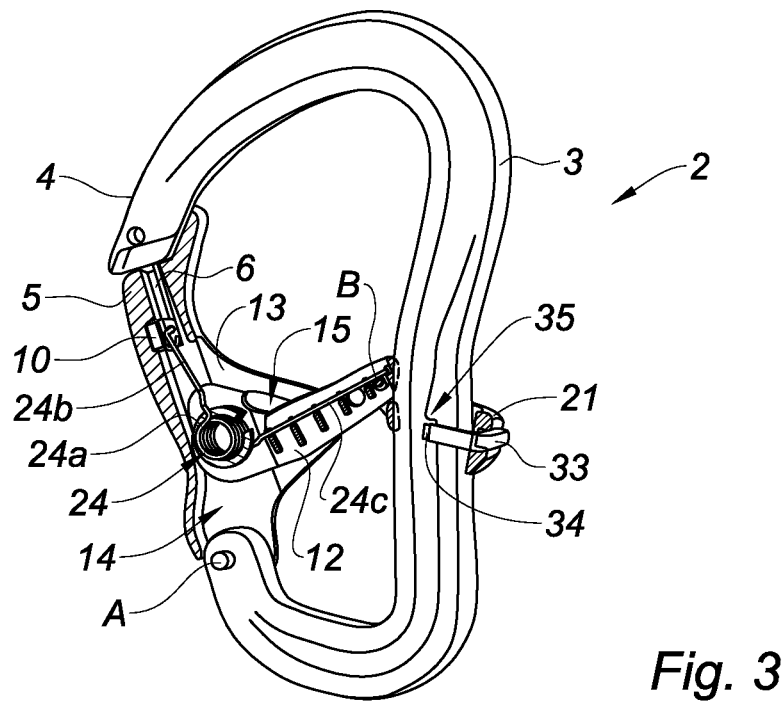
FIG. 3 is a perspective and partial cross-sectional view of the safety carabiner of FIG. 1 showing the closing finger in the closed position.
Figure 4:
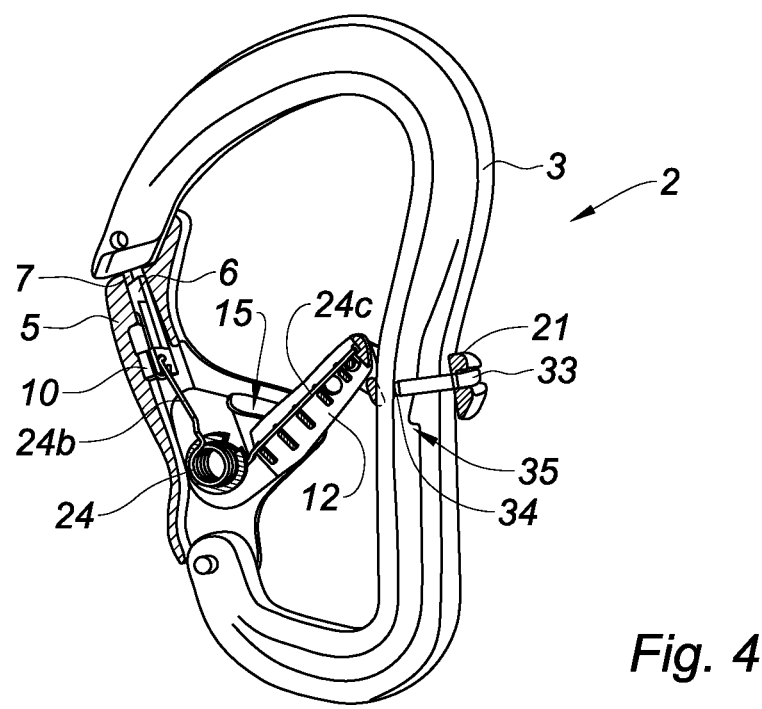
FIG. 4 is a perspective and partial cross-sectional view of the safety carabiner of the figure showing the locking means in the unlocked position.
Figure 5:
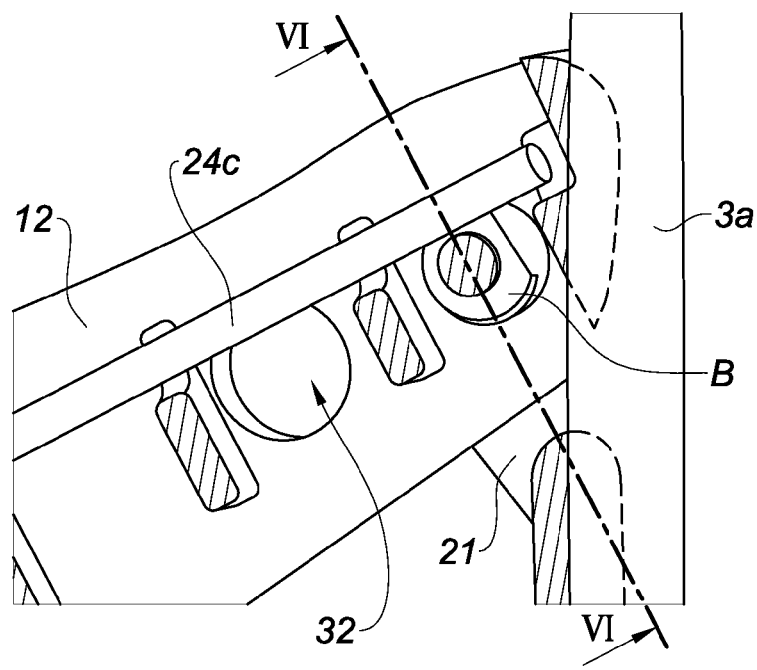
FIG. 5 is an enlarged view of a detail of FIG. 3.

As shown more particularly in FIGS. 3 and 4, the locking means comprise a locking finger 6 movably mounted in a housing 7 formed in the closing finger 5 and emerging in the free end of the closing finger 5. The locking finger 6 is arranged to cooperate, in the locked position, with a first opening 8 (shown in FIG. 10) formed in the retaining portion 4.

The hook-shaped portion 3b advantageously has a second through opening 9 emerging in the first opening 8 so as to prevent an accumulation of dirt inside the first opening 8, and therefore any risk of unwanted blockage of the locking finger 6.

The safety carabiner 2 also includes a locking indicator 10, advantageously a bright color, secured to the locking finger 6 and provided to indicate that the closing finger 5 is locked. Preferably, the closing finger 5 includes a window 11, and the locking indicator 10 can move between a first position in which it is visible through the window 11 and indicates that the closing finger 5 is locked, and a second position in which it is shifted relative to the window 11, and therefore not visible, and indicates that the closing finger 5 is unlocked.

The safety carabiner 2 also includes actuating means arranged to move the locking means between the locked and unlocked positions thereof.

The actuating means comprise an actuating member 12 connected to the locking finger 6 and movably mounted on the closing finger 5 between at least one first position (shown in FIGS. 1 and 3) in which the locking finger 6 is in the locked position, and a second position (shown in FIGS. 2 and 4) in which the locking finger 6 is in the unlocked position.

The actuating member 12 is configured so as to bear against a part of the central portion 3a turned toward the inside of the carabiner, when it is in its first position.

The closing finger 5 advantageously has two substantially parallel side wings 13 delimiting a housing 14 in which the actuating member 12 extends at least partially. Each side wing 13 of the closing finger 5 comprises a lumen 15 substantially in the shape of an arc of circle 16 centered on the pivot axis A of the closing finger 5.

The actuating member 12 comprises substantially flat first and second surfaces 17, 18 opposite one another, and first and second lugs 19 (only one lug is shown in the figures) respectively formed on the first and second flat surfaces 17, 18 and respectively slidingly mounted in the corresponding lumens 15. The first and second lugs 19 are coaxial and extend substantially parallel to the pivot axis A of the closing finger 5.

The actuating means also include a handling member 21 movably mounted on the central portion 3a of the body of the carabiner, between a first position (shown in FIGS. 1 and 3) and a second position (shown in FIGS. 2 and 4), and in which the actuating member 12 is hingedly mounted around a hinge pin B substantially parallel to the hinge pin A of the closing finger 5.

The handling member 21 includes a first stirrup-shaped portion 21 movably mounted around the central portion 3a of the body of the carabiner, and a mounting portion 21b situated inside the carabiner and comprising two substantially parallel tabs 21c secured to the handling portion 21a. The mounting portion 21b forms a yoke supporting the hinge pin B.

The handling and actuating members 21, 12 are arranged so that moving the handling member 21 between the first and second positions thereof moves the actuating member 12 between its first and second positions, and such that moving the actuating member 12 between the first and second positions thereof moves the locking finger 6 between its locked and unlocked positions.

More particularly, moving the handling member 21 toward its second position causes the hinge pin B to more further away from the central portion 3a, and thus pivots the actuating member 12 relative to the closing finger 5, around its lugs 19.

The body 3, the actuating and handling members 12, 21 and the closing finger 5 delimit a first basic frame 22, accessible after moving the closing finger 5 toward its open position, intended to receive a rope or an anchor point, and a second basic frame 23, separated from the first basic frame 22 by the handling and actuating members, intended to receive a tether.

The safety carabiner also includes a torsion spring 24 mounted on the actuating member 12 and arranged on the one hand to stress the closing finger 5 toward its closed position, and on the other hand to stress the actuating member 12 toward its first position.

The torsion spring 24 is formed by a metal wire wound around itself to form a central loop 24a mounted in a complementary housing delimited by the actuating member 12, the central loop 24a extending through a first branch 24b arranged to stress the closing finger 5 toward its closed position and the free end of which is mounted on the locking finger 6, and by a second branch 24c arranged to stress the actuating member 12 toward its first position.

The hinge pin B is mounted undetachably on the actuating member 12, and is axially movable between an operating position (shown in FIG. 6) in which it extends through the actuating and handling means 12, 21, and a disassembled position (shown in FIG. 7) in which it does not extend through the actuating member 12 and allows the handling and actuating members 12, 21 to be disassembled.

Figure 6:
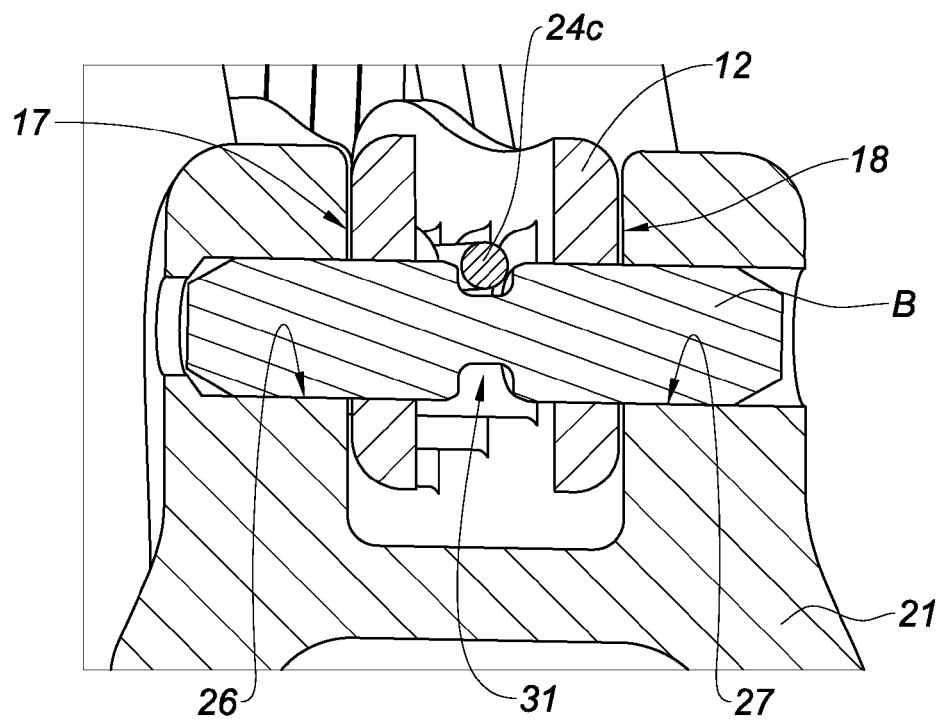
FIG. 6 is a perspective cross-sectional view along line VI-VI of FIG. 5.
Figure 7:
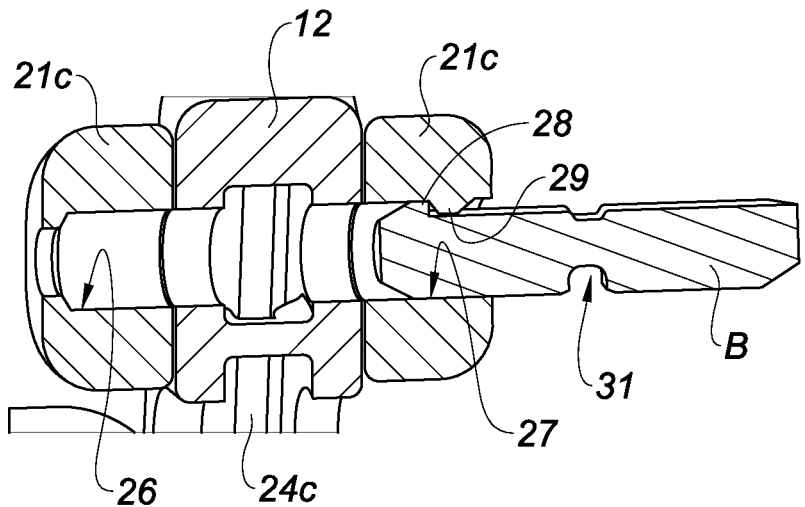
FIG. 7 is a perspective cross-sectional view showing the hinge pin in the disassembled position.
Figures 8, 9:
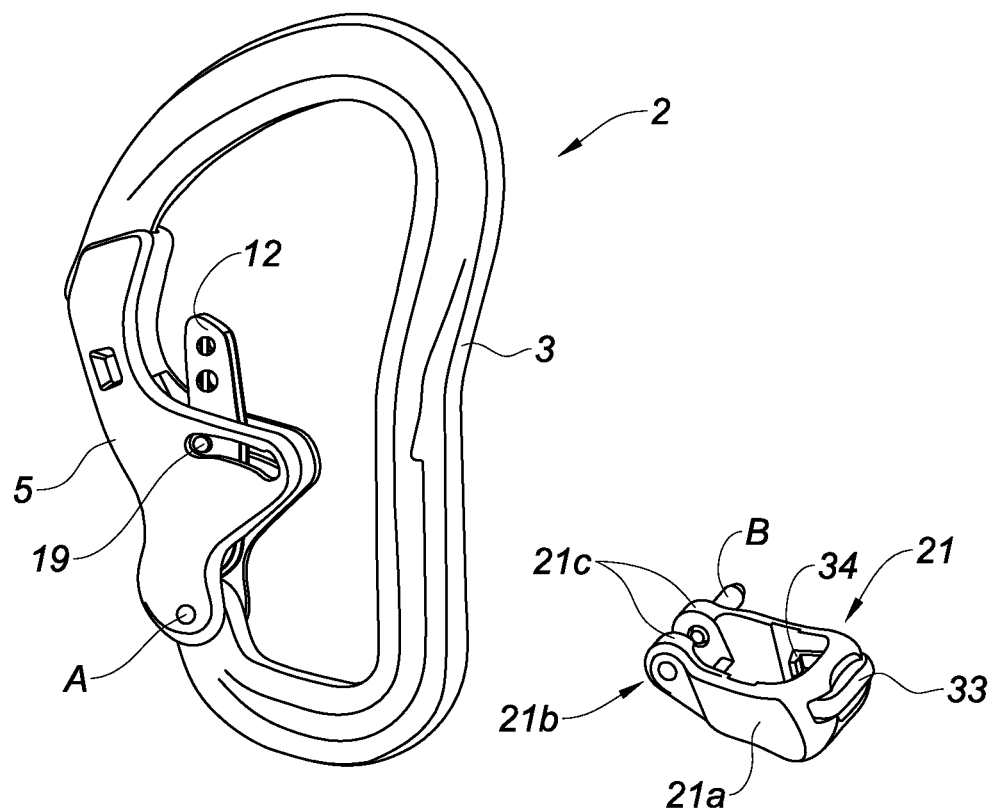
FIG. 8 is a perspective view of the carabiner of FIG. 1 in which the handling member has been removed.
FIG. 9 is a perspective view of the handling member of the carabiner of FIG. 1.

As shown in FIGS. 6 and 7, each tab 21c of the mounting portion 21b comprises an eyelet 26, 27 intended to receive the hinge pin B, the eyelet 26 comprising a portion having a section smaller than the maximum section of the hinge pin B so as to prevent the removal thereof through said eyelet, and the eyelet 27 being configured to allow a partial removal of the hinge pin B through said eyelet.

The undetachable assembly of the hinge pin B is done in particular by providing a shoulder 28 on the hinge pin B close to one of its ends, and a lug 29 protruding in the eyelet 27 and arranged to cooperate with the shoulder 28.

In order to immobilize the hinge pin B in its operating position, the latter comprises a peripheral groove 31 in the bottom of which the second branch 24c of the torsion spring 24 bears.

The actuating member 12 advantageously comprises a lumen 32 emerging at the second branch 24c of the torsion spring 24. The lumen 32 is arranged to allow the passage of a tool intended to move the second branch 24c of the torsion spring 24 outside the peripheral groove 31 so as to allow the hinge pin B to move between the operating and disassembly positions thereof.

The safety carabiner 2 includes blocking means movable between a position blocking the handling member 21 in its first position, and a position unblocking the handling member 21 allowing the latter to move toward its second position.

The blocking means comprise a generally U-shaped control button 33 whereof at least one branch, and preferably each branch, is equipped with a blocking finger 34. The control button 33 is movably mounted on the handling member 21 between a blocking position (shown in FIG. 3), in which the or each blocking finger 34 is arranged to cooperate with a stop 35 formed on the central portion 3a of the body so as to prevent the handling member 21 from moving toward its second position, and an unblocking position (shown in FIG. 4), in which each blocking finger 34 is shifted relative to the corresponding stop 35 so as to allow the handling member 21 to move toward its second position.

According to one embodiment, the control button comprises an elastically deformable portion arranged so as to favor a return of the latter part toward its blocking position.

Figure 10:
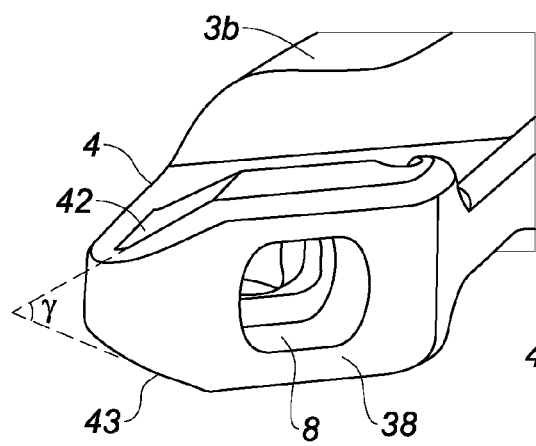
FIGS. 10 and 11 are perspective views of one end of the body of the carabiner of FIG. 1.
Figure 11:
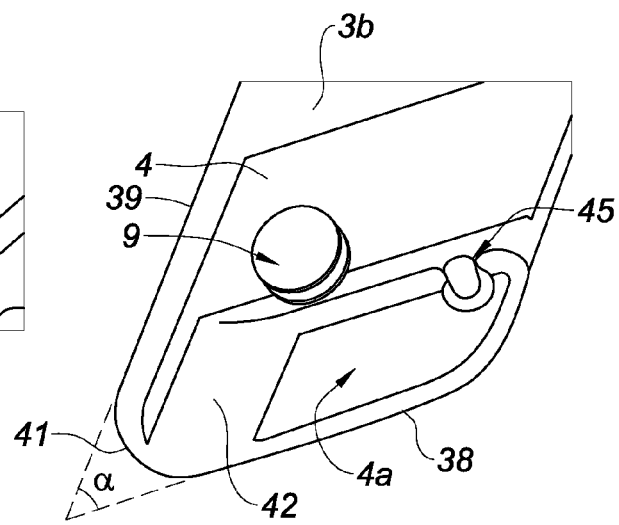
Figure 12:
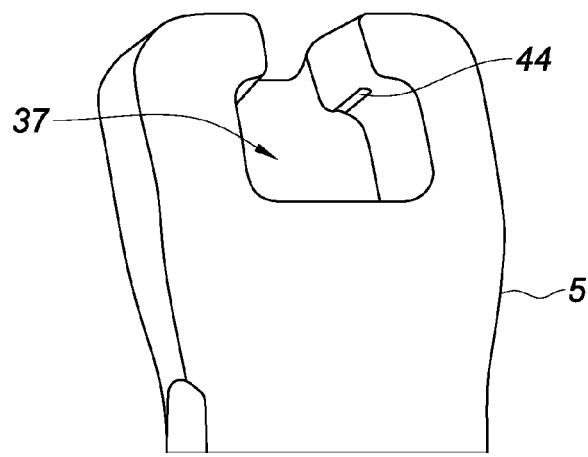
FIG. 12 is a perspective view of the free end of the closing finger of the carabiner of FIG. 1.

As shown in FIGS. 10 and 11, the retaining portion 4 comprises a slender end portion 4a oriented toward the outside of the carabiner. In side view, the carabiner is generally tapered. Furthermore, in front view, the retaining portion 4 is substantially T-shaped. As shown in FIG. 12, the free end of the closing finger 5 has a housing 37 with a shape substantially complementary to that of the retaining portion 4 and intended to receive the latter. These measures in particular make it possible to reinforce the breaking load of the carabiner.

The end portion of the retaining portion 4 is delimited inwardly and outwardly by first and second substantially flat surfaces 38, 39, respectively, converging toward one another and extending substantially parallel to the pivot axis A.

The first and second substantially flat surfaces 38, 39 form an angle $\alpha$ smaller than or equal to 90°, and preferably between 20 and 70°, and advantageously between 30 and 60°.

Figure 13:
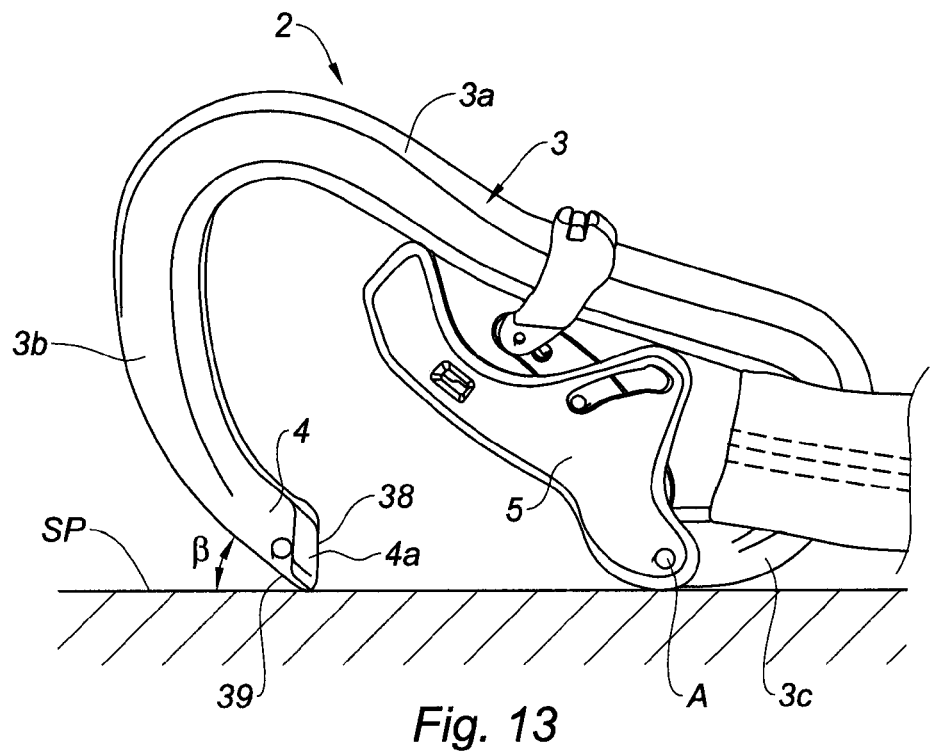
FIG. 13 is a side view of the carabiner of FIG. 1 with the first and second branches of the body bearing on a flat support.
Figure 14:
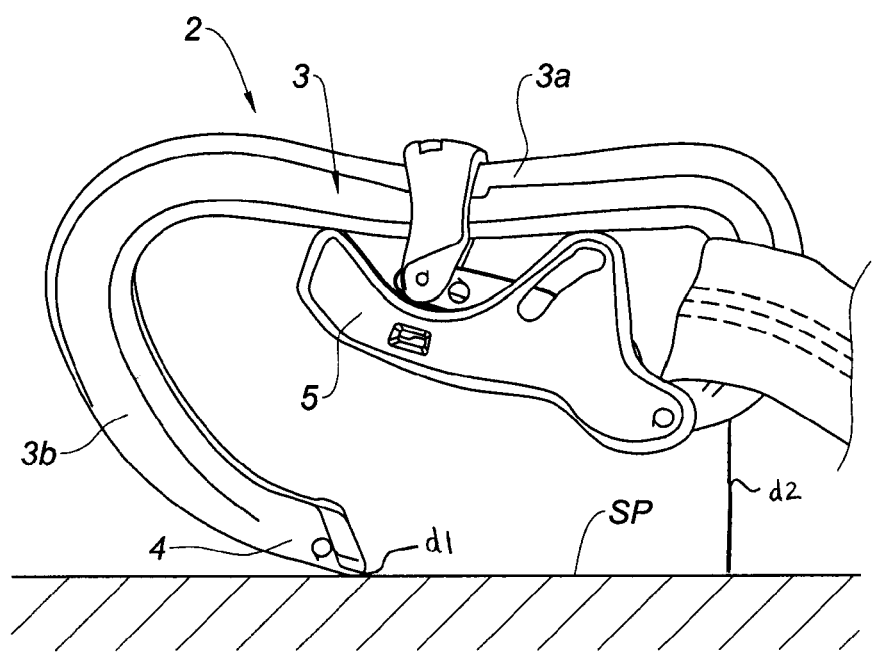
FIG. 14 is a side view of the carabiner of FIG. 1 with the first branch of the body bearing on a flat support and the second branch shifted relative to the flat support.

As shown in FIG. 13, when the safety carabiner extends substantially perpendicular to a flat support SP and the first and second branches 3b, 3c of the body bear on the flat support, the second substantially flat surface 39 and the flat support form an angle $\beta$ smaller than or equal to 90°, preferably between 10 and 80°, and advantageously between 30 and 60°.

The first and second substantially flat surfaces 38, 39 are connected to one another by a rounded intermediate portion 41. The rounded intermediate portion 41 is outwardly delimited by a cylindrical surface portion extending substantially parallel to the hinge pin A and having a curve radius smaller than or equal to 3 mm, and for example approximately 2 mm.

The end portion 4a of the retaining portion 4 is laterally delimited by at least third and fourth substantially flat surfaces 42, 43 converging toward the free end of the end portion 4a. The third and fourth substantially flat surfaces 42, 43 form an angle $\gamma$ smaller than or equal to 120°, and preferably between 30 and 90°. These measures make it possible to facilitate the attachment of a safety line along a flat surface by laterally tilting the body of the carabiner relative to the flat surface.

It should be noted that the retaining portion 4 is configured so that in the bearing position of the first and second branches of the body on a flat support, the free end of the end portion 4a, i.e. the tip thereof, forms the bearing zone of the first branch 3b on the flat support.

The closing finger 5 advantageously comprises a rib 44 protruding in the housing 37, and the retaining portion 4 comprises a retaining surface 45 intended to cooperate with the rib 44. The rib 44 is arranged to flatten the retaining surface 45 when the load exerted on the carabiner exceeds a predetermined value.

The method for fastening the carabiner 2 on an anchor point will now be described.

The fastening method comprises the following steps:
  exerting pressure on the control button 33 so as to move it toward its unblocked position, moving the handling member 21 toward its second position so as to move the actuating member 12 toward the second position thereof and to move the locking finger 6 toward its unlocked position, exerting pressure on the closing finger 5 so as to move it toward its open position, engaging the hook-shaped portion 3b inside the anchor point, ceasing to exert pressure on the closing finger 5.

When the user stops exerting pressure on the closing finger 5, the first and second branches of the torsion spring 24 respectively stress the closing finger 5 toward its closed position and the actuating member 12 toward its first position. This results in locking the closing finger 5 relative to the body and moving the handling member 21 toward its first position.

Figure 15:
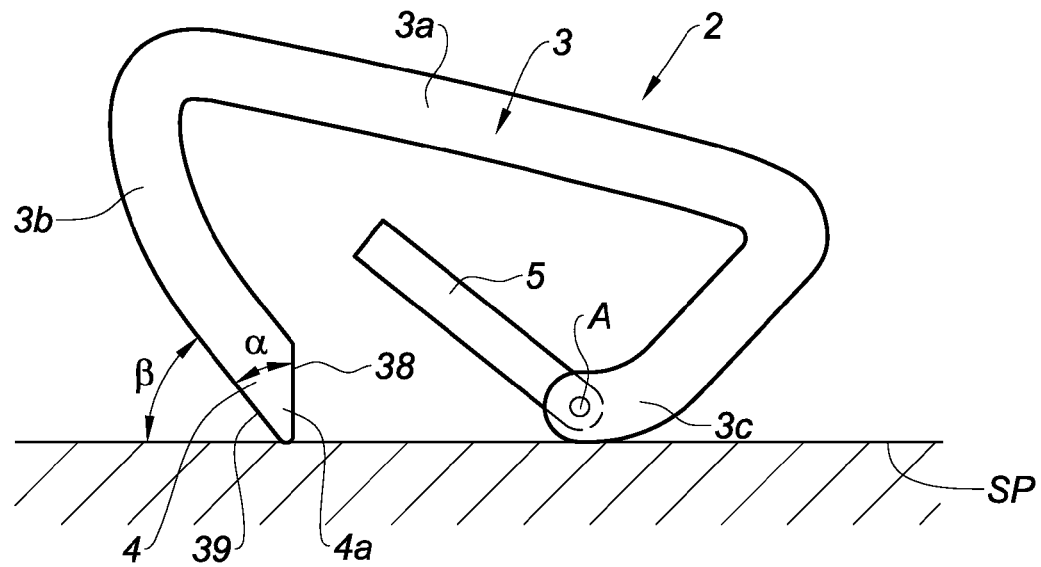
FIG. 15 is a diagrammatic side view of a safety carabiner according to a second embodiment of the invention.

FIG. 15 shows a second embodiment of the safety carabiner 2 that differs from that shown in FIGS. 1 to 14 essentially in that it does not comprise locking and actuating means.

Figure 16:
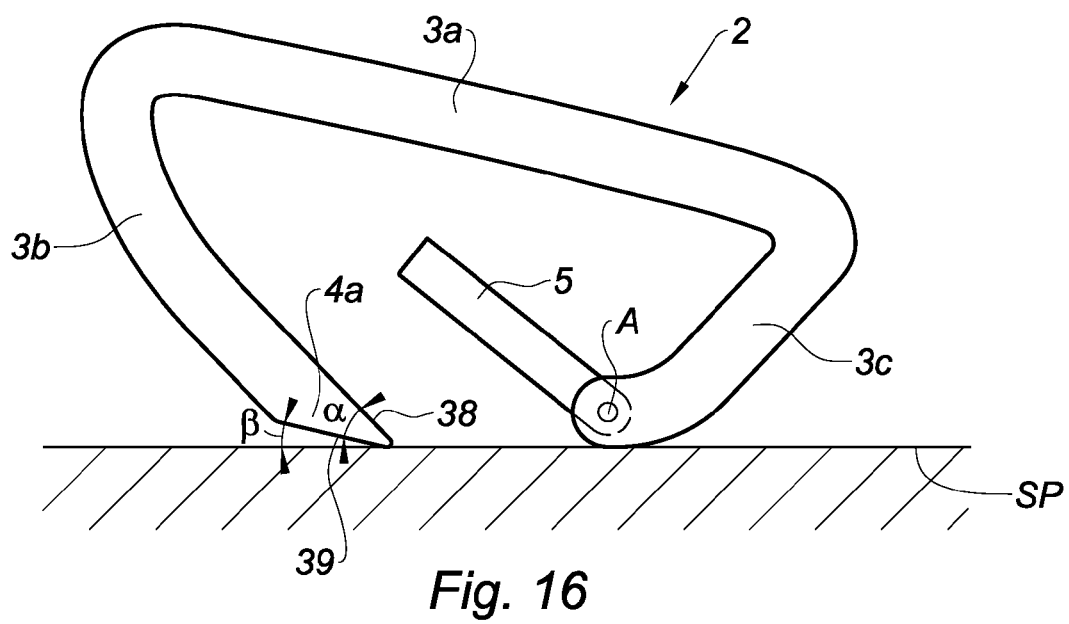
FIG. 16 is a diagrammatic side view of a safety carabiner according to a third embodiment of the invention.

FIG. 16 shows a third embodiment of the safety carabiner 2 that differs from that shown in FIG. 15 essentially in that the angle β is smaller than 20°.

The invention is of course not limited only to the embodiments of this safety carabiner described above as examples, but on the contrary encompasses all alternative embodiments.

The invention claimed is:

1. A safety carabiner, comprising:
a body comprising a central portion extended at ends thereof by a first hook-shaped branch and a second branch, respectively, the first branch including a retaining portion comprising a slender end portion, the slender end portion including a distal tip and being generally tapered seen from the side,
a closing finger pivotably mounted on the second branch of the body around a hinge pin, between a closed position in which the closing finger cooperates with the retaining portion and an open position in which the closing finger is tilted toward the inside of the carabiner,
wherein the retaining portion is configured so that, when the carabiner extends substantially perpendicular to a flat support such that the first and second branches of the body are bearing on said flat support, the distal tip of the slender end portion forms a bearing zone of the first branch on said flat support, and
wherein the slender end portion of the retaining portion is laterally delimited by at least two substantially flat side surfaces converging toward the distal tip of the slender end portion.

2. The safety carabiner according to claim 1, wherein the retaining portion is configured such that the distal tip of the slender end portion is situated at a first distance from said flat support smaller than or equal to 3 mm, when the carabiner extends substantially perpendicular to said flat support such that the first branch of the carabiner is bearing on said flat support and the second branch is situated at a second distance from said flat support, for at least a value of the second distance greater than 10 mm.

3. The safety carabiner according to claim 1, wherein the distal tip of the slender end portion is oriented toward the outside of the carabiner.

4. The safety carabiner according to claim 1, wherein the slender end portion of the retaining portion is at least partially inwardly and outwardly delimited by a substantially flat inner surface and a substantially flat outer surface, respectively, converging toward one another.

5. The safety carabiner according to claim 4, wherein the substantially inner and outer flat surfaces form an angle smaller than or equal to 90°.

6. The safety carabiner according to claim 4, wherein, when the carabiner extends substantially perpendicular to a flat support and the first and second branches of the body are bearing on the flat support, the substantially flat outer surface and the flat support form an angle smaller than or equal to 90°.

7. The safety carabiner according to claim 4, wherein the substantially flat inner and outer surfaces are connected to one another by a rounded intermediate portion.

8. The safety carabiner according to claim 7, wherein the rounded intermediate portion is outwardly delimited by a substantially cylindrical surface portion extending substantially parallel to the hinge pin.

9. The safety carabiner according to claim 8, wherein the substantially cylindrical surface portion preferably has a curve radius smaller than or equal to 3 mm.

10. The safety carabiner according to claim 1, wherein the two substantially flat side surfaces form an angle smaller than or equal to 120°.

* * * * *